(12) United States Patent
Biskeborn

(10) Patent No.: US 8,531,796 B2
(45) Date of Patent: Sep. 10, 2013

(54) FLY HEIGHT EXTRACTION SYSTEM

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 2815 days.

(21) Appl. No.: 10/754,392

(22) Filed: Jan. 9, 2004

(65) Prior Publication Data

US 2005/0152055 A1  Jul. 14, 2005

(51) Int. Cl.
*G11B 21/02* (2006.01)
*G11B 27/36* (2006.01)

(52) U.S. Cl.
USPC .............................................. 360/75; 360/31

(58) Field of Classification Search
None
See application file for complete search history.

(56) References Cited

U.S. PATENT DOCUMENTS 3,398,364 A * 8/1968 Rittenbach ................. 324/76.29
4,408,284 A * 10/1983 Kijesky et al. ................. 702/77
5,153,785 A * 10/1992 Muranushi et al. ............. 360/75
5,831,781 A * 11/1998 Okamura ........................ 360/31
6,239,936 B1 * 5/2001 Abraham et al. ............... 360/75
6,317,210 B1  11/2001 Wen et al. ...................... 356/375
6,930,844 B2  8/2005 Yeh et al.
7,113,354 B2 * 9/2006 Dakroub et al. ................ 360/25
2002/0197936 A1 * 12/2002 Smith ............................. 451/41
2003/0007279 A1  1/2003 Johnson et al. ................. 360/75

* cited by examiner

*Primary Examiner* — Daniell L Negron
(74) *Attorney, Agent, or Firm* — Walter W. Duft

(57) ABSTRACT

A system and method for monitoring fly height between a magnetic recording medium and a transducing head. In a first exemplary embodiment, magnetic spacing change value is calculated using media noise on the recording medium (instead of prerecorded tones) to provide a broadband frequency distribution that results in improved Wallace equation accuracy. In a second exemplary embodiment, a magnetic spacing change value is acquired by any suitable method but is adjusted as necessary to reflect transducing head wear, thus providing a methodology for calculating changes in fly height by taking into account the signal loss that is attributable to wear. In this way, a basic understanding of the mechanism causing changes in magnetic spacing is achieved.

19 Claims, 10 Drawing Sheets

FLY HEIGHT EXTRACTION SYSTEM

BACKGROUND OF THE INVENTION

1. Field of the Invention

This invention relates to data storage systems employing magnetic recording media. More particularly, the invention is directed to tape drive systems and the monitoring of tape fly height during tape drive operations to facilitate data read/write accuracy.

2. Description of the Prior Art

By way of background, during operation in a tape drive data storage apparatus, a tape medium is transferred from (to) a supply reel to (from) a take-up reel while data is read from or written to the tape by one or more read/write heads. Typically (e.g., in a single reel cartridge design), the tape medium is spooled onto a reel and this reel is mounted inside a cartridge that is inserted into a slot in the tape drive so that the tape is in magnetic contact with the read/write heads. The tape from the cartridge winds onto a take-up reel that is located in the tape drive. The tape is advanced past the read/write head(s) by means of a pair of motors, one for each reel, which engage the reels when the cartridge is inserted and rotate the reels at a desired tape speed.

An important parameter to control during the service life of a tape drive is the fly height of the streaming tape medium relative to the read/write heads. As shown in FIG. 1A, fly height is the separation between the tape and the tape bearing surfaces of a head. Theoretically, the tape should be in intimate contact with the head such that the fly height is zero. However, the actual fly height can change during service as a result of contamination build up on the tape bearing surfaces and/or the tape, changes in head geometry due to wear, and other factors. An increase in fly height can produce a condition known as magnetic spacing loss in which the signal amplitude is reduced and uncorrectable data errors are produced. The increase in uncorrectable data errors over time is referred to as error rate drift.

A conventional technique is to measure changes in the tape magnetic spacing (also known as magnetic separation) relative to an initial reference condition. This is done using the well known Wallace Spacing Loss relationship to calculate the magnetic spacing change from measured amplitudes of readback signals derived from a series of tones that are prerecorded on the media. A disadvantage of using prerecorded tones to calculate magnetic spacing change is that the recorded tone information can decay over time such that calculation errors are introduced. In addition, read heads must be accurately aligned to the tracks containing the tones during readback. A further disadvantage of the conventional technique is that the magnetic spacing change calculation does not elucidate the tribological factors that go into creating the change. In particular, as shown in FIG. 1B, the change in magnetic spacing determined by the Wallace Spacing Loss relationship will not indicate change in true fly height if the read sensor (or the write coil element) becomes recessed from the tape bearing surfaces. In that case, the magnetic spacing (MS) is due to a combination of fly height (FH) and recession (R), as follows: $MS=FH+R$. Relatedly, the fly height is the difference between the magnetic spacing and the recession, as follows: $FH=MS-R$. A change in magnetic spacing is likewise due to changes in fly height and recession, as follows: $\Delta MS = \Delta FH + \Delta R$. An additional consideration when using the Wallace Spacing Loss relationship is that a calculated change in magnetic spacing could be due to a change in the surface roughness and/or compliance of the tape medium, which produces a change in fly height alone.

Accordingly, it is desired to have an improved method of monitoring head-media interface conditions in a tape drive data storage system, including the ability to accurately monitor changes in fly height, head recession, and tape surface conditions. More generally, it would be advantageous to improve the methodology for monitoring head-media interface conditions in any data storage system that utilizes magnetic recording media, including not only tape drives, but disk drives as well.

SUMMARY OF THE INVENTION

The foregoing problems are solved and an advance in the art is obtained by a novel system and method for monitoring fly height between a magnetic recording medium and a transducing head, and for characterizing other head-media conditions. In a first exemplary embodiment of the invention, a magnetic spacing change value is calculated using media noise on the recording medium (instead of prerecorded tones) to provide a broadband frequency distribution that results in improved magnetic spacing calculation accuracy. In a second exemplary embodiment of the invention, a magnetic spacing change value is acquired by any suitable method but is adjusted as necessary to reflect transducing head wear, thus improving the accuracy of fly height (FH) monitoring by taking into account the signal loss that is attributable to wear. In this way, a basic understanding of the mechanism causing magnetic spacing change can be achieved.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENT

Figure 1A:
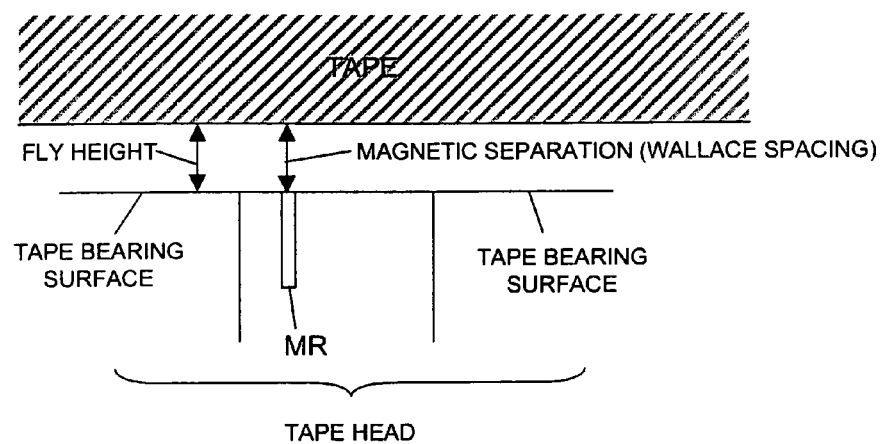
FIG. 1A is a diagrammatic illustration of a head-media interface in a tape drive.

The invention will now be described by way of exemplary embodiments shown by the drawing figures (which are not necessarily to scale), in which like reference numerals indicate like elements in all of the several views.

Figure 2:
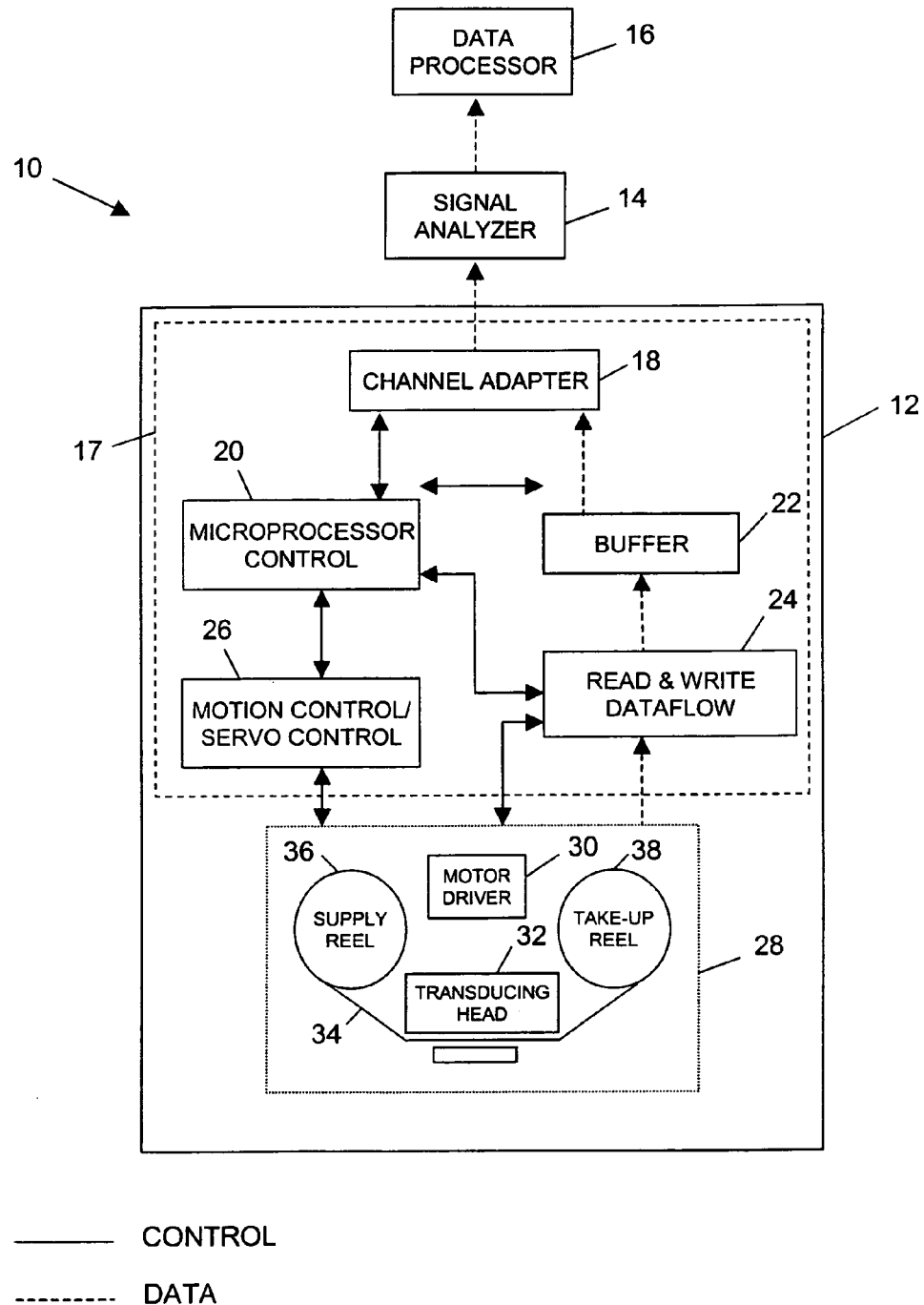
FIG. 2 is a functional block diagram showing components that may be used to implement an exemplary system for determining fly height in accordance with the invention.

Turning to FIG. 2, a system 10 is shown that can be used to monitor the fly height between a magnetic recording medium, and particularly a streaming tape medium, and a transducing head. Similar systems for use with other types of media, such as magnetic disks, could also be constructed but will not be described herein in the interest of brevity.

Figure 3A:
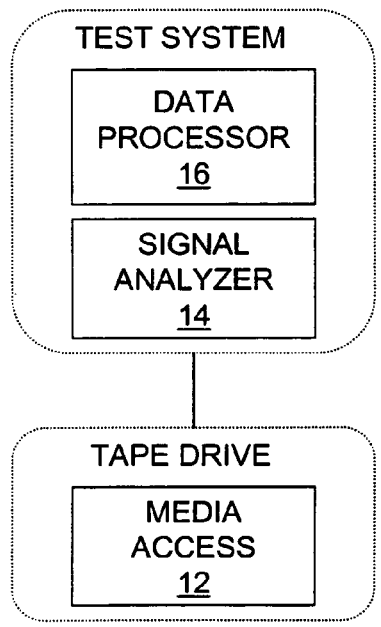
FIGS. 3A, 3B and 3C are diagrammatic illustrations showing exemplary combinations of the system components of FIG. 2.
Figure 3B:
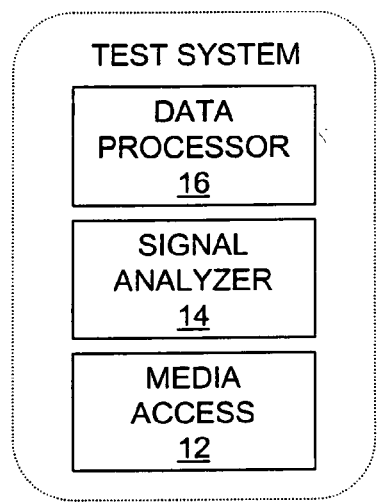
Figure 3C:
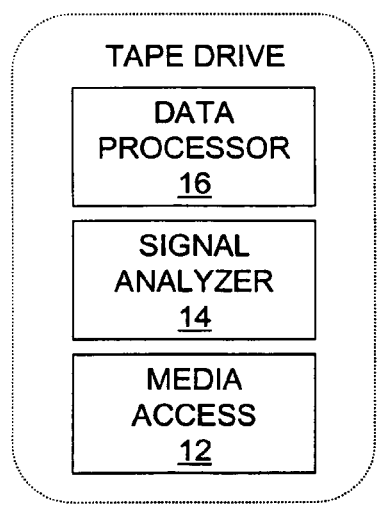

The system 10 is shown to include a media access component 12, a signal analyzing component 14, and a data processing component 16. In the interest of clarity, it should be stated at the outset that although the components 12, 14 and 16 act in concert to perform the functions of the system 10, they are not necessarily part of a single apparatus or system in a commercial sense. Some of the components could be embodied within a commercial tape drive system while others are embodied within a dedicated test system that is temporarily connected to the tape drive system when it is desired to perform fly height testing thereon. For example, as described below, the media access component 12 can be adapted to perform the functions of a conventional tape drive. As such, this component could represent the aforementioned commercial tape drive system. As shown in FIG. 3A, the signal analyzing component 14 and the data processing component 16 could then represent the dedicated test system to which the tape drive is connected for testing purposes only (e.g., to evaluate transducing head conditions). On the other hand, as shown in FIG. 3B, all of the components 12, 14 and 16 could be incorporated within a dedicated test system (e.g., for evaluating tapes). FIG. 3C shows a further implementation in which the components 12, 14 and 16 are all part of a commercial tape drive system (e.g., for periodically evaluating transducing head and/or tape conditions).

The media access component 12 is shown in FIG. 2 to include a drive electronics section 17 comprising plural functional elements providing a control and data transfer system for reading information from a magnetic tape medium. If the media access component 12 is constructed along the lines of a commercial tape drive, these elements would conventionally include a channel adapter 18, a microprocessor controller 20, a data buffer 22, a read/write data flow circuit 24, and a motion control system 26. The latter two elements connect to a tape interface system 28 that includes a motor driver system 30 and a transducing head 32. The motor driver system 30 includes reel motors for performing forward and reverse movement of a magnetic tape medium 34 mounted on a supply reel 36 and a take-up reel 38.

The microprocessor controller 20 provides overhead control functionality for the operations of the media access component 12 shown in FIG. 2. As is conventional, the functions performed by the microprocessor controller 20 are programmable via microcode routines (not shown) according to desired operational characteristics. During data read operations, physical data from the read/write circuitry 24 is received from the tape interface system 28. The drive components of the tape interface system 28 are controlled by the motion control system 26 and the motor driver circuit 30 to execute such tape movements as forward and reverse recording and playback, rewind and other tape motion functions. In addition, in multi-track tape drive systems, the motion control system 24 transversely positions the transducing head 32 relative to the direction of longitudinal tape movement in order to access data in a plurality of tracks.

The read/write dataflow circuitry 24 is responsible for executing data transfer operations under the supervision of the microprocessor controller 20. After it reads information from the magnetic tape medium 34, the read/write dataflow circuitry 24 passes the information to the data buffer 22. The data buffer 22 in turn communicates the information received from the read/write dataflow circuitry 26 to the channel adapter 18. The microprocessor controller 20 activates the channel adapter 18 to perform the required host interface protocol for transferring the information to the signal analyzing component 14.

Figure 4A:
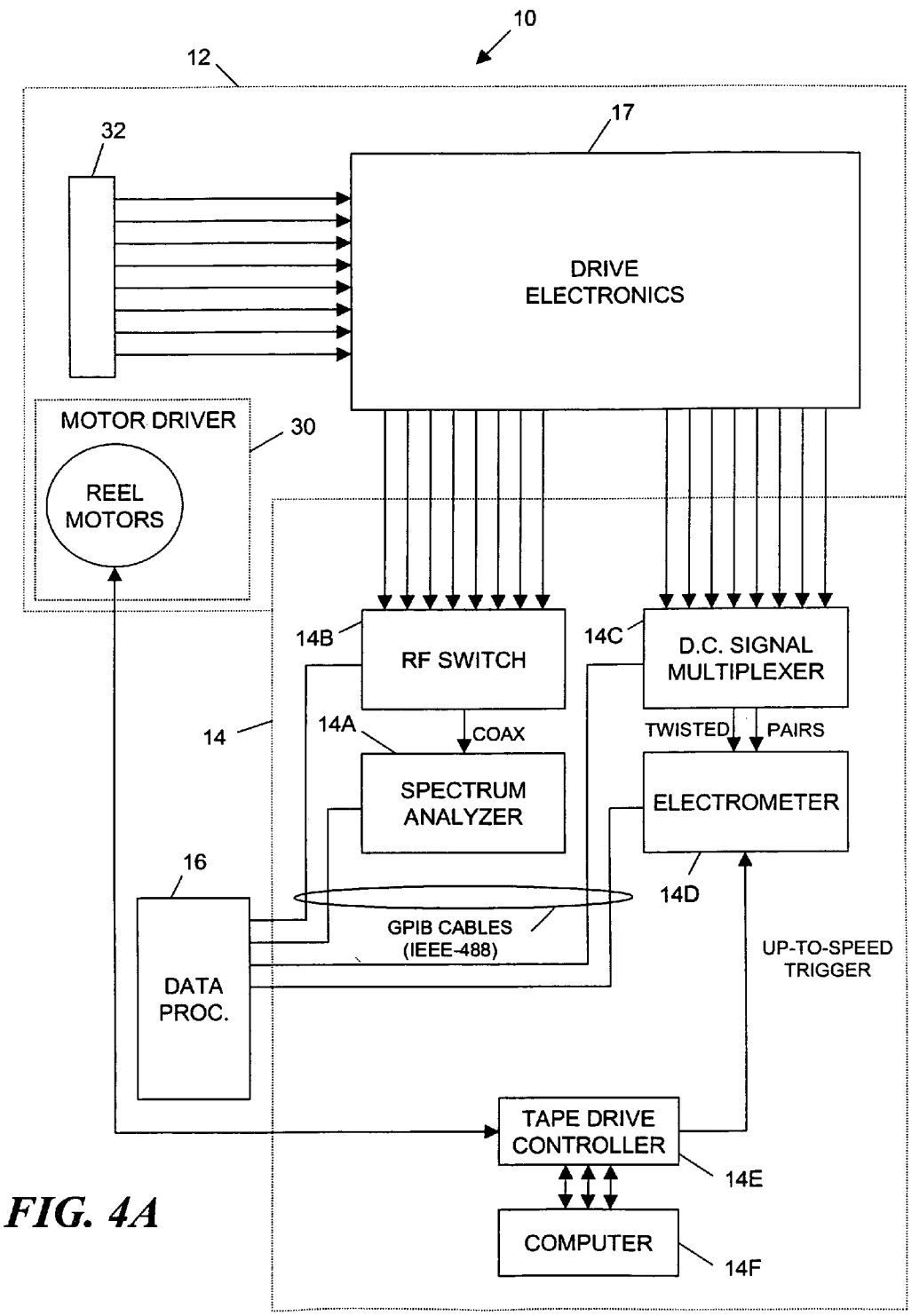
FIG. 4A is a functional block diagram showing an exemplary implementation of the components of FIG. 2.
Figure 4B:
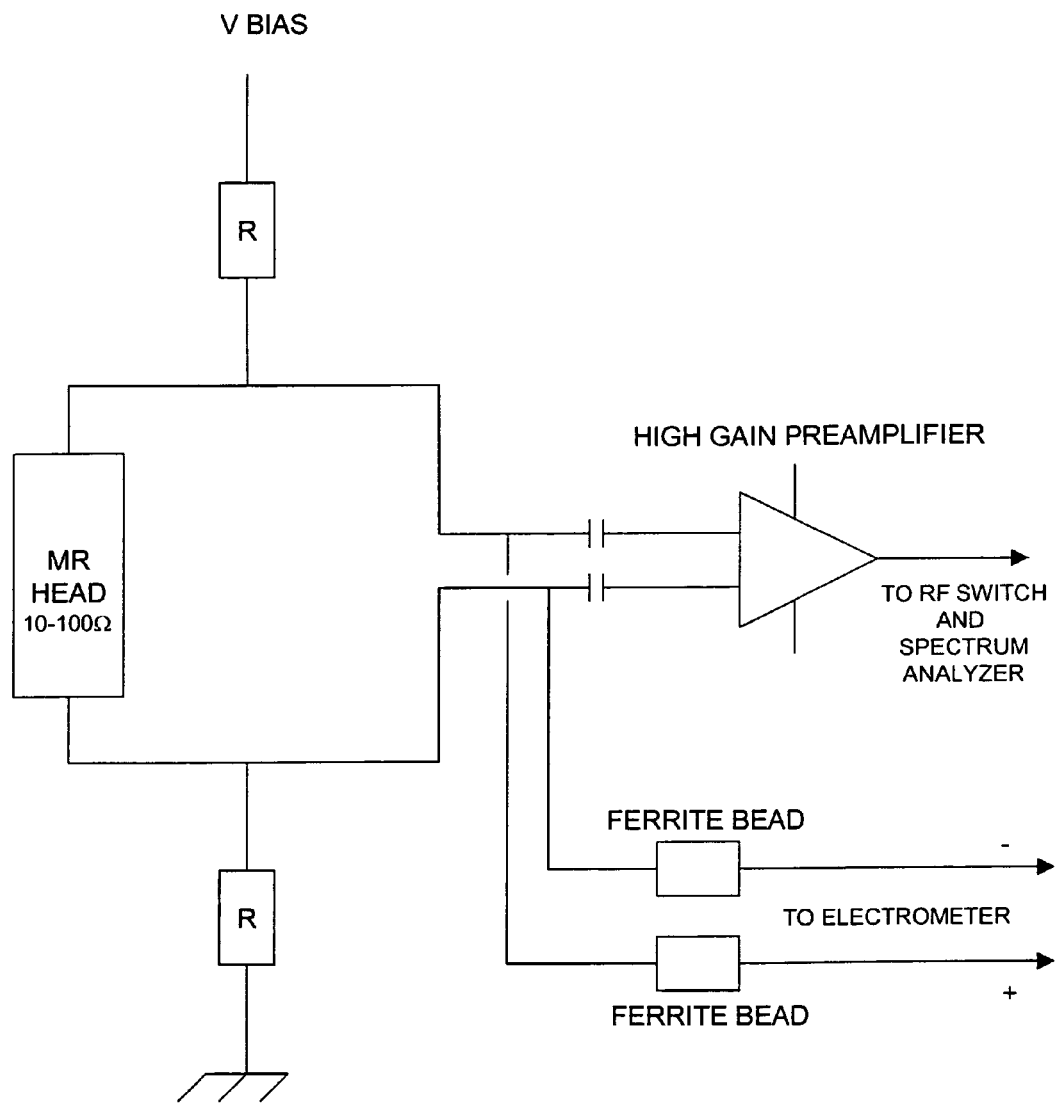
FIG. 4B is a schematic diagram showing circuitry for monitoring A.C. erased tape noise power spectrum information and D.C. magnetoresistive read head voltage drop information in accordance with the invention.

As described in more detail below, the signal analyzing component 14 can be implemented using a conventional spectrum analyzer or a signal processor implementing a Fast Fourier Transform algorithm. By way of example only, FIG. 4A shows the use of a spectrum analyzer 14A, a high density switch system configured to provide an RF switch 14B and a D.C. signal multiplexer 14C, an electrometer 14D and a tape drive controller 14E managed by a computer 14F. Each of the foregoing components is conventional in nature. For example, the spectrum analyzer 14A can be implemented using an HP 4395A spectrum analyzer from Hewlett Packard Company. The RF switch 14B and the multiplexer 14C can be implemented using a Keithley 7001 switch system from Keithley Instruments, Inc. The electrometer can be implemented using a Keithley 6514 electrometer. A GPIB (General Purpose Interface Bus) according to the IEEE-488 standard can be used to interconnect the foregoing components to the data processor 16. As additionally shown in FIG. 4B, the foregoing configuration is used to simultaneously monitor AC erased tape noise power spectrum information and DC voltage drop across a conventionally biased MR sensor of the transducing head 32. Signals from one or more channels of the tape medium 34 are read by the MR sensor, pre-amplified by a factor of approximately 300 times and forwarded to RF switch 14B and the spectrum analyzer 14A. The RF switch 14B is programmed to select channels of interest and pass their noise signals to the spectrum analyzer 14A. As additionally shown in FIG. 4B, differential voltage levels representing the voltage drop across the MR sensor are presented to the electrometer 14D for measurement. As can be seen in FIG. 4A, the drive controller 14E is used to activate the RF switch 14B and the multiplexer 14C when the reel motors 33 are spinning at a speed that is consistent with data read/write operations.

The data processing component 16 can be implemented as a programmed general-purpose computer. It runs a software program that performs magnetic spacing, head wear and fly height calculations based on the data provided by the signal analyzer 14. These calculations are described in more detail below.

Figure 5:
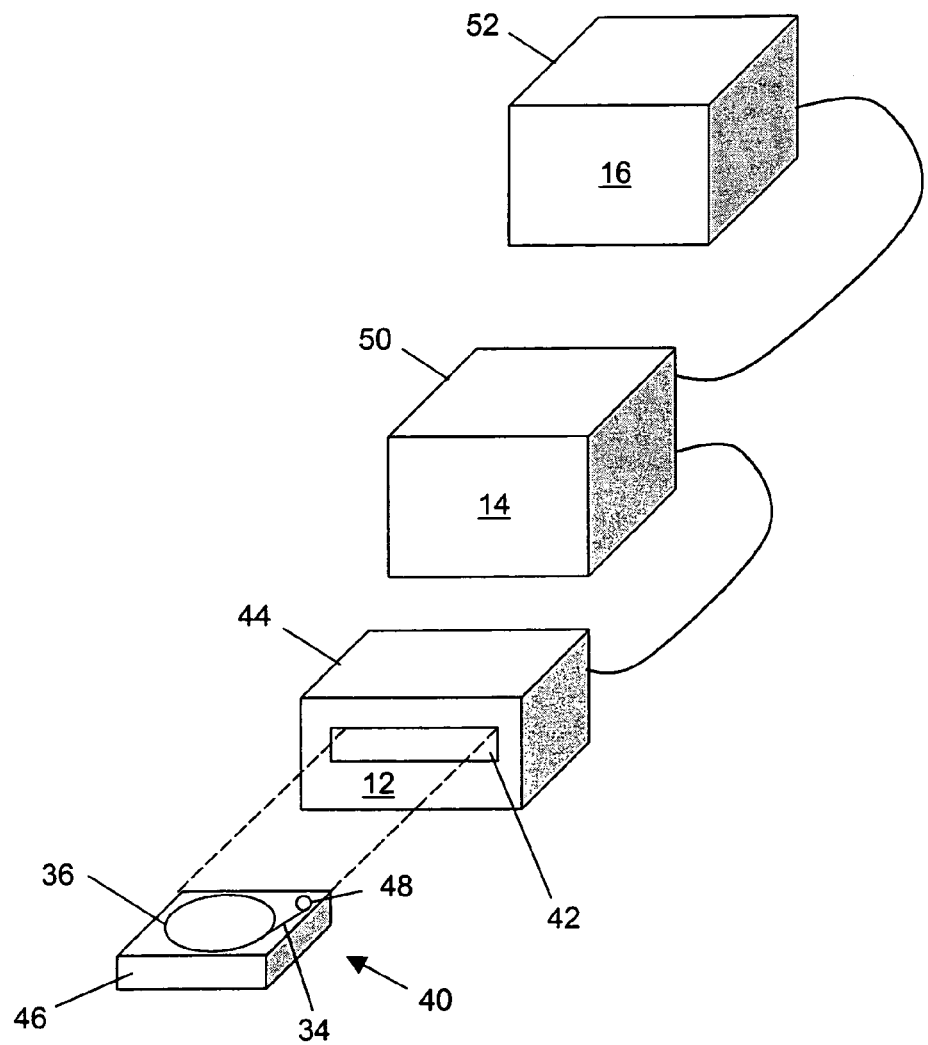
FIG. 5 is a perspective view showing the system of FIG. 2 in an arrangement that may be used in conjunction with removable magnetic tape cartridges.

In some cases, as shown in FIG. 5, the magnetic tape medium 34 will be mounted in a cartridge 40 that can be inserted via a slot 42 into an enclosure 44 that houses the media access component 12. The tape cartridge 40 comprises a casing 46 that contains the magnetic tape medium 34. The supply reel 36 is shown to be situated within the casing 46. As is conventional, when the cartridge 40 is inserted into the slot 42, the magnetic tape medium 34 is drawn out of the cartridge by engaging the leader pin 48 and then wound onto a take up reel (not shown) situated within the enclosure 44. FIG. 5 also illustrates the signal analyzing component 14 and the data processing component 16 being housed within separate enclosures 50 and 52, respectively. Again, this configuration is shown by way of example only and it should be understood that the components 12, 14 and 16 need not be physically separate from each other, and could be combined into two enclosures, or even one enclosure.

Figure 6:
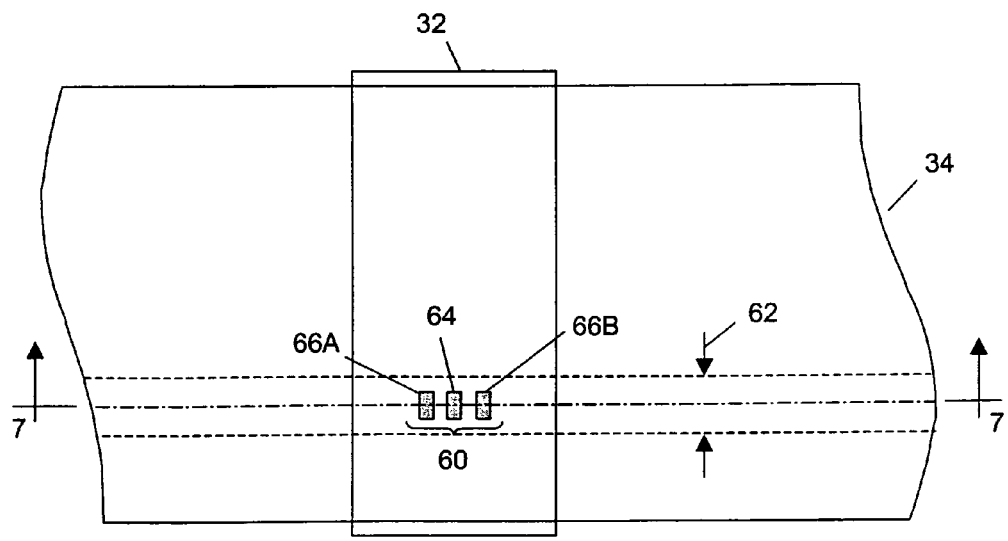
FIG. 6 is a schematic plan view representation of an exemplary magnetic recording medium superimposed over an exemplary transducing head.

Turning now to FIG. 6, the outline of a portion of the magnetic tape medium 34 is superimposed over the transducing head 32 to illustrate the positioning of these components as they would be oriented during operation of the system 10. By way of example only, the transducing head 32 is shown to be constructed as a "linear" tape drive transducer in which plural read sensor/write coil sets are arranged along the longitudinal axis of the transducer (the vertical direction in FIG. 6) to respectively read from and write to data tracks extending longitudinally along the tape medium 34 (the horizontal direction in FIG. 6). Although not shown, a helical scan construction could also be used to implement the transducing head 32, as could any other suitable head design.

Figure 7:
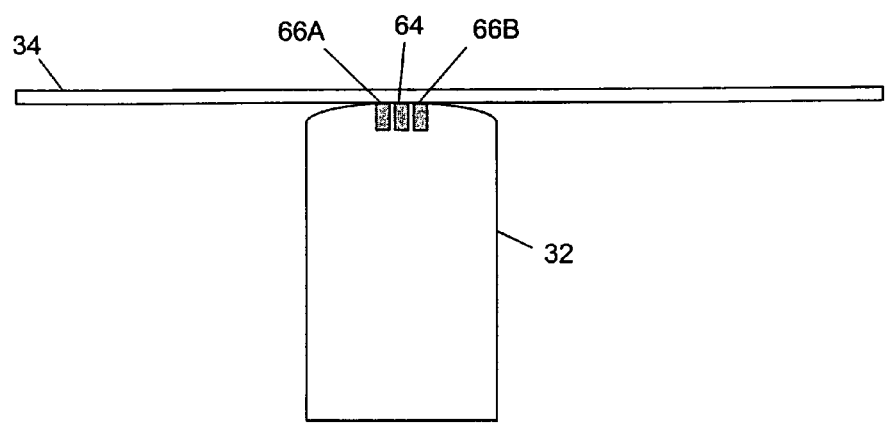
FIG. 7 is a cross-sectional view taken along line 7-7 in FIG. 6.

For ease of description, a single read sensor/write coil set 60 of the transducing head 32 is positioned over a single data track region 62 of the tape medium 34. In an actual implementation of these components there generally would be plural read sensor/write coil sets 60 and plural corresponding data tracks. As is conventional, each read sensor/write coil set 60 includes a read sensor 64 situated between two write coils 66A and 66B. FIG. 7 shows these components from a cross-sectional vantagepoint. For purposes of the present discussion, the distance between the tape medium 34 and the tape bearing surface of the transducing head 32 is referred to as the fly height. In a tape drive, the fly height is ideally zero insofar as the tape medium 34 is in physical contact with the transducing head 32. However, in the event that debris builds up between these components, the fly height will increase and cause magnetic spacing loss.

The system 10 allows the fly height to be accurately monitored so that problems arising from magnetic spacing loss can be identified and resolved. In one exemplary embodiment of the invention fly height monitoring is performed using a magnetic spacing calculation applied to frequency components derived from magnetic media noise on the tape medium 34. In a second embodiment of the invention, the magnetic spacing calculation is performed using any suitable signal stored on the tape medium 34, including either prerecorded tones or media noise. The magnetic spacing calculation is then adjusted as necessary to reflect transducing head wear, thus enabling computation of the change in actual fly height, i.e., the physical separation between the tape medium 34 and the tape bearing surface of the transducing head 32, relative to a fly height reference condition (as determined by a previous calculation). In this manner, changes in actual fly height, magnetic spacing, and recession can all be characterized. In addition, changes in medium surface conditions can be characterized, but this may require additional, similar, testing using a control head.

According to the first embodiment, the noise signal can be provided by erasing all or a portion of the tape medium 34 along one or more of the data tracks 62 thereof. This can be done using one of a conventional D.C. erase procedure, an A.C. erase procedure, or a bulk erase procedure. The result of the A.C. or bulk erase procedure will be to randomize the magnetic domains associated with the magnetic particles on the tape medium's recording surface.

When the tape medium 34 is passed by a read sensor 64 of the transducing head 32 (see FIGS. 6 and 7), the random magnetic domains on the tape will produce a broadband noise signal containing multiple frequency components from long to short wavelengths. Each observed frequency "f" in the broadband media noise signal is related to the wavelength $\lambda$ of magnetic domain patterns on the tape by the formula: $f=v_{tape}/\lambda$, where $v_{tape}$ is the velocity of the tape. The read sensor 64 cannot resolve frequencies much higher than $f_{max}=v_{tape}/g$, where g is the read sensor gap length. In general, $f_{max}$ is typically on the order of 10-25 megahertz for read gaps of 0.1-0.4 microns, and tape velocities in the range of 2-10 meters per second. The particles on the tape are typically small in comparison to the read gap, thus ensuring sufficient media noise power, even near the upper frequency limit.

When the broadband noise signal is captured by the signal analyzing component 14, there will be an electronic noise component generated by the amplification circuitry of the read channel (e.g., the read sensor preamplifier) of the media interface component 12. To separate the electronic noise signal from the pure media noise signal, two separate noise readings can be taken. A first noise reading is taken before the tape medium 34 starts to translate relative to the transducing head 32 as part of the tape-streaming mode of the media access component 12. This reading will contain only the electronic noise signal. A second noise reading is taken after the tape medium begins to stream and includes the desired media noise signal in addition to the electronic noise signal. Applying conventional "sum-of-the-squares" noise theory processing, the signal analyzing component 14 removes the electronic noise signal from the media noise signal. The resultant spectral pattern output will represent a substantially "pure" media noise signal.

The signal analyzing component 14 captures both noise components and decomposes the spectral patterns into constituent frequency bands by using either a conventional digital sampling apparatus such as a digital oscilloscope with an FFT (Fast Fourier Transform) capability, or a spectrum analyzer. Each method has its own advantages. The FFT method uses rapid digital sampling of the waveform and is the faster of the two acquisition methods. As such, it could be used to evaluate fly height changes on a real time or near real time basis as the tape medium 34 streams past the transducing head 32. This may be useful for characterizing fly height conditions during actual tape drive operations, if such information is desired. The spectrum analyzer provides slower measurements insofar as readings must be taken over several narrow bandwidth ranges, each of which generally employs relatively slow averaging techniques. However, this method can be used in non-real time applications, which may represent the most likely manner in which fly height would be measured in practice. In such applications, the time required to acquire the desired frequency components over the entire bandwidth of the media noise signal is not a critical factor. The advantage of using a spectrum analyzer is that it averages the noise in real time for improved signal quality and avoids aliasing artifacts that can affect FFTs.

Regardless of whether an FFT algorithm or a spectrum analyzer is used to characterize the spectral pattern of the noise signals, the subtracted outputs should contain signal amplitude values for at least two characteristic frequency bands. These amplitude values are used as inputs to a magnetic spacing change calculation, which is performed by the data processing component 16. Conventional magnetic spacing processing is based on the recognition that changes in signal losses due to head/media separation are different for different frequencies. In particular, for a given increase in magnetic spacing, high frequency signal components fall off more than low frequency components.

Figure 8:
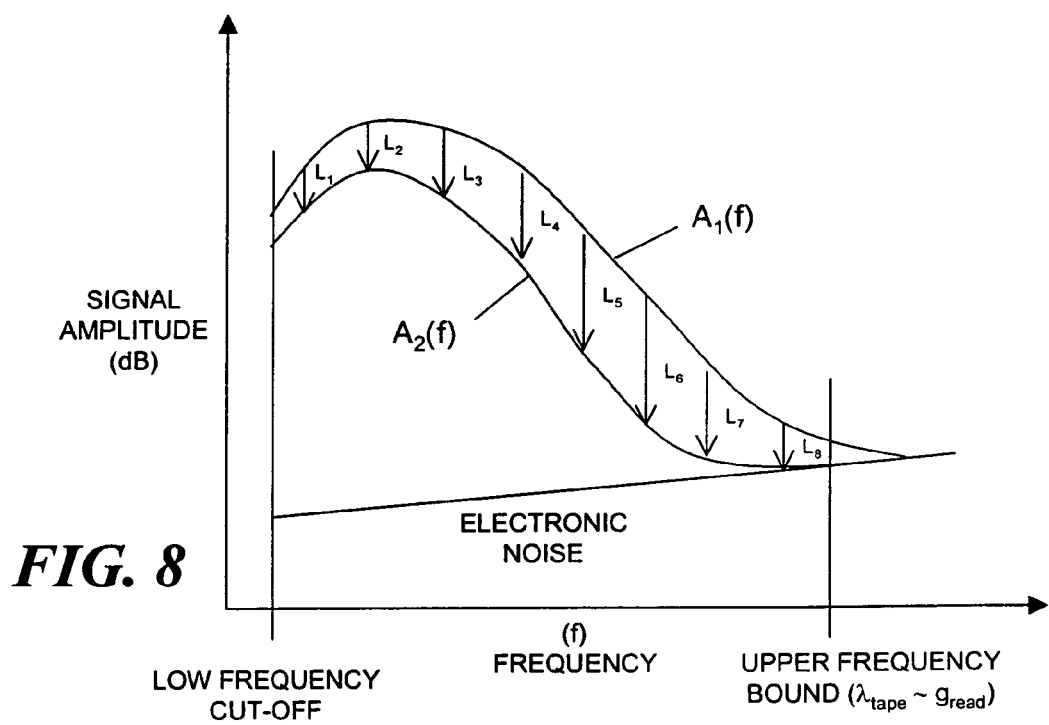
FIG. 8 is a graph showing noise signal amplitude as a function of frequency.

Set forth below is an exemplary magnetic spacing calculation that is implemented by the data processing component 16 to calculate changes in magnetic spacing using all of the signal amplitude values provided by the signal analyzing component 14 and a linear regression analysis. Each signal amplitude value corresponds to a different frequency band of the pure media noise signal read from the tape medium 34. As shown in FIG. 8, the following calculation allows changes in magnetic spacing to be determined relative to a reference condition represented by the curve $A_1(f)$ to a current condition represented by the curve $A_2(f)$.

In general, the difference in amplitude between two media noise signal curves is given by equation (1) below:

$$A(f) = Ao(f)e^{-2\pi d/\lambda} \qquad 1)$$

Where:
d=head-tape (magnetic) spacing;
$\lambda$=signal wavelength on tape (f=v/$\lambda$, where f=frequency and v=tape velocity); and
Ao=shape of the signal at zero spacing (not known or predicted).

From the foregoing, it will be seen that the magnetic spacing loss relationship between the curves $A_1(f)$ and $A_2(f)$ of FIG. 8 is as follows:

$$A_2/A_1 = e^{-2\pi(d2-d1)/\lambda} \qquad 2)$$

From equation (2) it will be seen that:

$$\ln A_2/A_1 = -2\pi\Delta d/\lambda \qquad 3)$$

When expressed in dB, equation (3) becomes:

$$(20/\ln 10)\ln A_2/A_1 = -54.6\Delta d/\pi \qquad 4)$$

This can be simplified to:

$$A_2/A_1 (\text{in } dB) = -54.6\Delta d/\lambda \qquad 5)$$

It will be seen that the foregoing equation resembles the linear equation (y=mx+b) where "y" can be equated to $A_2/A_1$, "x" can be equated to $1/\pi$), and "m," the slope of the line, can be equated to $-\Delta d$, the magnetic spacing change. Thus, a linear regression analysis can be performed on the entire media noise power spectrum (using conventional linear regression equations and several (at least two) data points) to determine a slope value $-\Delta d$ that corresponds to the plot shown in FIG. 9 of the following data determined by measurement:

$$20\log_{10}[A_{media(time=t)}/A_{media(time=0)}] \text{ vs. } 1/\lambda (=f/v).$$

The magnetic spacing change calculated in the manner set forth above can be used as a basis for characterizing conditions associated with the transducing head 32 and/or the tape medium 34. For example, when a transducing head or a tape medium are initially placed in service, the curve $A_1(f)$ of FIG. 8, can be determined to establish a set of initial baseline $A_{media(time\ t=0)}$ values at selected frequencies. Then, after each cycle of the tape medium, or at any other desired interval, a new curve $A_2(f)$ can be determined to establish a set of $A_{media(time=t)}$ values that are compared against the baseline values to determine the magnetic spacing change $\Delta d$. If the magnetic spacing increases over time, it may be an indication that the tape fly height has increased because debris has built up on the transducing head and/or the tape medium.

Figure 9:
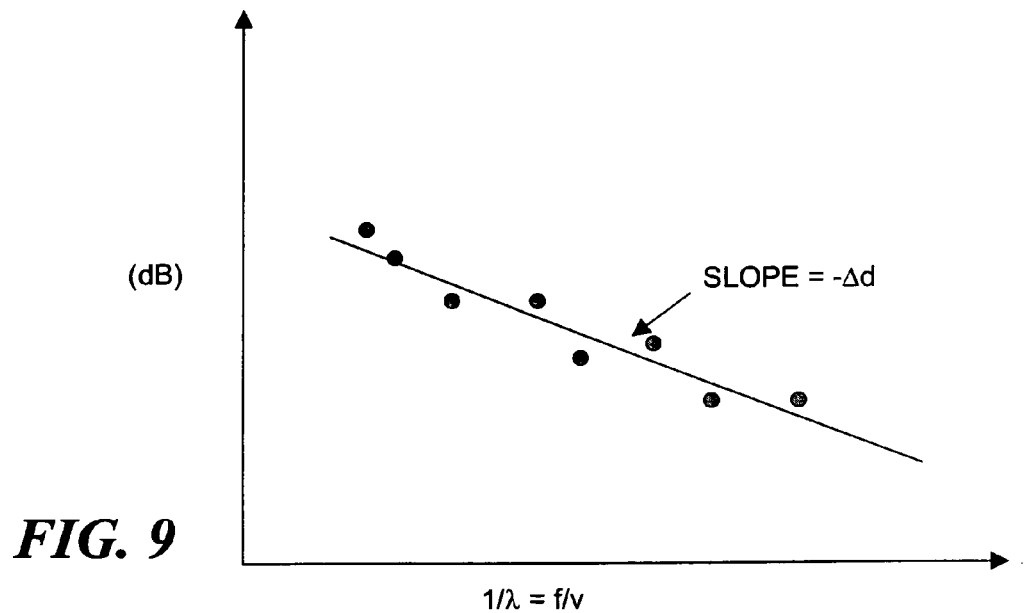
FIG. 9 is a graph showing the results of a linear regression analysis in which the slope of the curve represents magnetic spacing change.

The sampling points where each of the values used in the plotting the graph of FIG. 9 are identified in FIG. 8 by the notations $L_1, L_2 \ldots L_8$. It will be seen that as the frequency (f) approaches the high frequency limit imposed by the read gap length, the media noise signal drops off and approaches the electronic noise. The shift between initial condition and subsequent wear media noise power spectra must also vanish. Thus, $L_1, L_2, L_3, L_4, L_5$, and $L_6$ appear to grow while $L_7$ and $L_8$ appear to get smaller as the cut-off frequency is approached. Correcting for electronic noise will take care of this issue.

It will be appreciated that the foregoing magnetic spacing information may not be enough to completely diagnose a problem or characterize the condition of a transducing head or tape medium. As such, the invention further contemplates the second embodiment referred to above as an optional enhancement to the system 10 and method thereof. According to this second embodiment, the magnetic spacing change value is adjusted as necessary to reflect transducing head wear, thus enabling accurate computation of changes in fly height and/or head wear by taking into account the signal loss that is attributable to sensor recession. If the read sensor 64 is a magnetoresistive (MR) sensor of the type commonly used in tape drives, the transducing head wear is reflected in a reduction in MR stripe height with a corresponding increase in MR resistance. However, changes in ambient temperature can affect MR resistance to an even greater degree, such that temperature-related resistance changes must be accounted for before MR resistance can be used as an accurate measure of stripe height.

Figure 1B:
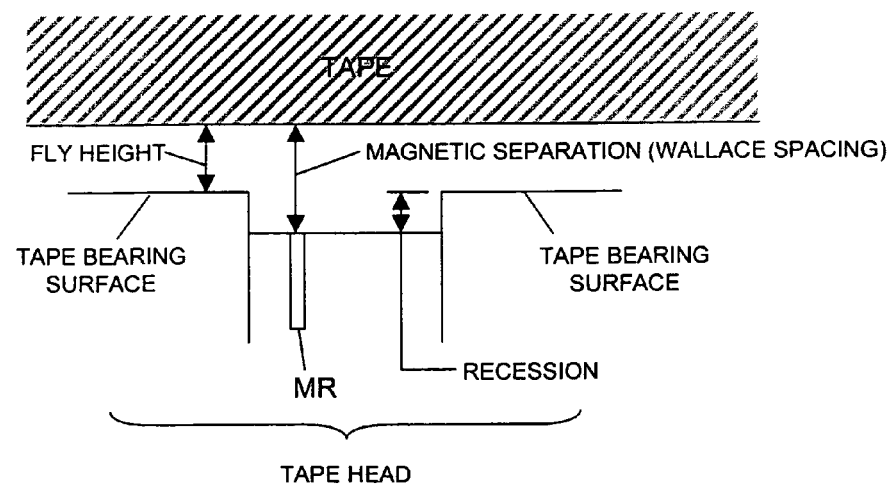
FIG. 1B is a diagrammatic illustration as in FIG. 1A in which a magnetoresistive (MR) read sensor of the head is recessed from the tape bearing surfaces of the head.

According to the second embodiment of the invention, the solution is to measure the resistance through the write coil or coils (66A or 66B), which also varies according to temperature, and use this to correct the MR resistance value for temperature drift. In order to correlate the corrected MR resistance to MR stripe height, separate testing of one or more sample transducing heads is needed to establish the required relationship curve between resistance and changes in MR stripe height (recession). Once the relationship between MR stripe height change and MR resistance has been characterized, measurements of M resistance for any given read sensor, such as the sensor 64, can be combined with magnetic spacing change calculations for the sensor to give changes in the physical fly height of a magnetic recording medium. In particular, as shown in FIG. 1B, the actual fly height change value can be computed by taking the difference between the magnetic spacing change value and the MR stripe height change value according to the relationship:

$$\Delta FH = \Delta MS - \Delta R; \qquad 6)$$

where $\Delta FH$=fly height change;
$\Delta MS$=magnetic spacing change; and
$\Delta R$=recession change (where recession is inversely proportional to MR stripe height).

In addition, special attention must be given to the fact that as a medium wears, it gets smoother and flies closer to the head, etc. To characterize this tape change, measurements could be taken using a wear-coated reference transducing head to characterize the effects of tape wear on the calculations. Alternatively, the procedure could include the periodic monitoring of unworn media with the head under test.

Figure 10:
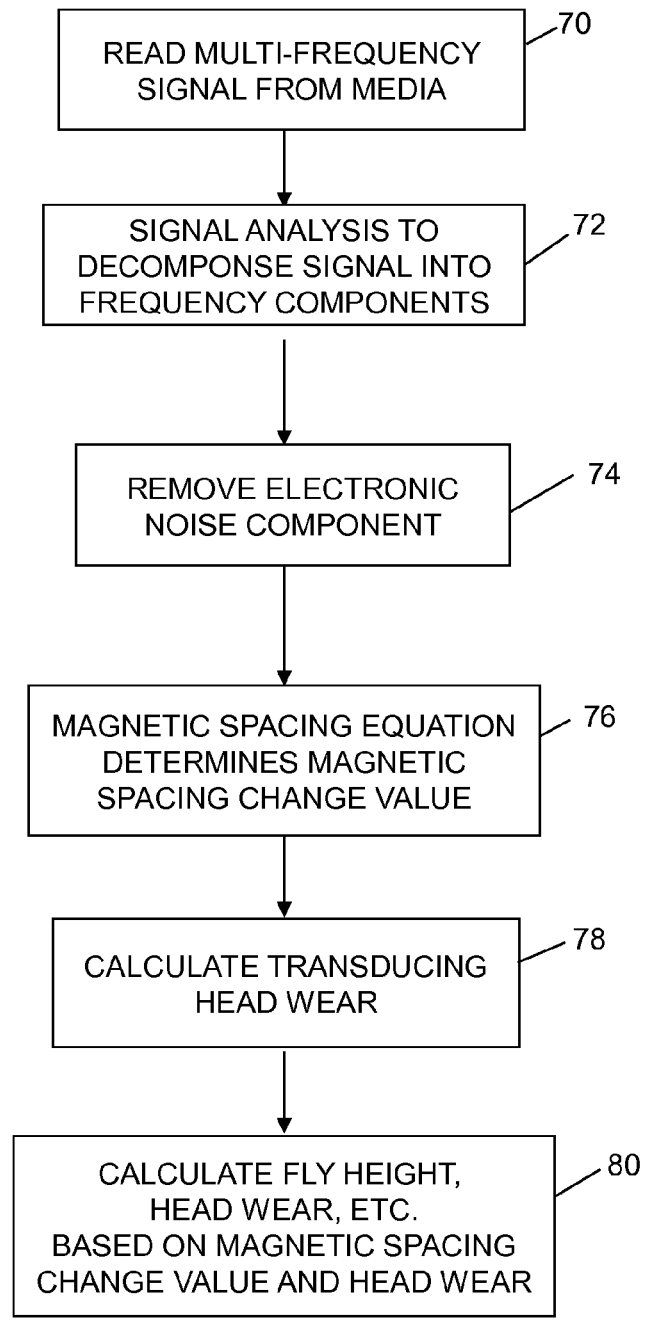
FIG. 10 is a flow diagram showing exemplary method steps in accordance with the present invention.

Turning now to FIG. 10, a flow diagram sets forth a generalized set of exemplary method steps that can be implemented by the system 10 to perform fly height calculations according to a combination of the two embodiments described above. Beginning in a first step 70, the media access interface reads a multi-frequency signal from the tape medium 34 that is either based on prerecorded tones of different frequency or a broadband media noise signal, as described above. Assuming a broadband media noise signal is used, this signal is passed to the signal analyzer 14 and the signal is decomposed in step 72 into constituent frequency components and the signal amplitudes thereof are calculated. In step 74, the electronic noise portion of frequency component is removed to produce pure media noise signal amplitude values. These signal amplitude values are input to the data processor 16 and the magnetic spacing change calculation described above is performed in step 76 relative to reference signal amplitudes to determine the change in magnetic spacing. The magnetic spacing change value may be used at this point as a measure of the change in fly height. Alternatively, step 78 can be optionally performed to calculate transducing head wear and this value can be used in step 80 to calculate the actual fly height change taking into account head wear.

Accordingly, a system and method have been disclosed for monitoring changes in fly height and other conditions that may develop between a magnetic recording medium and a transducing head. While various embodiments of the invention have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. A method for monitoring fly height between a magnetic recording medium and a transducing head, comprising:
    calculating a magnetic spacing change value relative to the recording medium and the transducing head; and
    adjusting the magnetic spacing change value as necessary to reflect transducing head wear.

2. A method in accordance with claim 1 wherein said magnetic spacing change value is calculated from media noise sensed on the recording medium.

3. A method in accordance with claim 2 wherein said media noise is processed so as to be substantially free of electronic power spectra noise generated by read channel circuitry associated with the transducing head.

4. A method in accordance with claim 2 wherein said magnetic spacing change value is calculated after decomposing said media noise into frequency components using a Fast Fourier Transform conversion process.

5. A method in accordance with claim 2 wherein said magnetic spacing change value is calculated after decomposing said media noise into frequency components using a spectrum analyzing process.

6. A method in accordance with claim 2 wherein said magnetic spacing change value is calculated using at least two frequency components of said media noise.

7. A method in accordance with claim 1 wherein transducing head wear is determined by measuring transducing head signal amplitude after accounting for changes in amplitude due to conditions other than transducing head wear.

8. A method in accordance with claim 1 wherein the transducing head comprises a magnetoresistive (MR) read sensor and transducing head wear is determined by measuring a change in MR stripe height of the read sensor while using measured resistance of a write coil component of the transducing head to correct for temperature drift.

9. A method in accordance with claim 8 wherein a change in fly height is calculated as the difference between the magnetic spacing change value and the change in MR stripe height.

10. A method in accordance with claim 1 wherein the magnetic recording medium comprises magnetic tape and the transducing head is a tape head.

11. A method for monitoring fly height between a magnetic recording medium and a transducing head, comprising:
    sensing media noise on the recording medium;
    calculating a magnetic spacing change value from the media noise; and
    adjusting said magnetic spacing change value as necessary to reflect transducing head wear.

12. A method in accordance with claim 11 wherein said media noise is generated by forming a substantially random pattern of magnetic domains on the recording medium using one of an A.C. erasure technique, a D.C. erasure technique or a bulk erasure technique.

13. A method in accordance with claim 11 wherein said media noise is processed so as to be substantially free of electronic power spectra noise generated by read channel circuitry associated with the transducing head.

14. A method in accordance with claim 11 wherein said magnetic spacing change value is calculated after decomposing said media noise into frequency components using a Fast Fourier Transform conversion process.

15. A method in accordance with claim 11 wherein said magnetic spacing change value is calculated after decomposing said media noise into frequency components using a spectrum analyzing process.

16. A method in accordance with claim 11 wherein said magnetic spacing change value is calculated using at least two frequency components of said media noise.

17. A method in accordance with claim 11 wherein transducing head wear is determined by measuring transducing head signal amplitude after accounting for changes in amplitude due to conditions other than head wear.

18. A method in accordance with claim 11 wherein the transducing head comprises a magnetoresistive (MR) read sensor and transducing head wear is determined by measuring a change in MR stripe height of the read sensor while using measured resistance of a write coil component of the transducing head to correct for temperature drift.

19. A method in accordance with claim 18 wherein a change in fly height is calculated as the difference between the magnetic spacing change value and the change in MR stripe height.

* * * * *